Dec. 25, 1945.   F. R. REUTTER   2,391,643

SELF-LOCKING NUT

Filed July 16, 1943

INVENTOR
Frederick R. Reutter
BY
Kenyon & Kenyon
ATTORNEYS

Patented Dec. 25, 1945

2,391,643

UNITED STATES PATENT OFFICE 2,391,643

SELF-LOCKING NUT

Frederick R. Reutter, Waterbury, Conn., assignor, by mesne assignments, to Allied Control Company, Inc., New York, N. Y., a corporation of New York Application July 16, 1943, Serial No. 494,903

2 Claims. (Cl. 151—7)

This invention relates to self-locking nuts.

A self-locking nut now on the market comprises a casing in the form of a cup having a flat bottom provided with an aperture and having the side wall of polygonal contour to define a polygonal socket. A metal nut member and a preferably elastic locking member are positioned within the casing and have their peripheries so shaped as to fit the inside of the casing. The rim of the side wall is scalloped to provide tapering integral tabs or extensions which are inturned over the locking member parallel to the cup base to retain the locking member and the nut member in the socket.

In the nut above referred to, the exterior side portions of the nut are plane surfaces extending the full height of the nut and both ends of the nut are flat so that one end of the nut is not readily distinguishable from the other end of the nut. Therefore, in order to apply the nut to a bolt so that the bolt first enters the nut member, it is necessary to scrutinize the nut carefully to distinguish the cup bottom end from the inturned tab end. As a result, either an unduly long time is required properly to apply the nuts or else the risk is run that some of the nuts will be improperly applied. Furthermore, it is customary to apply the nuts by use of a power socket wrench which is adapted to fit over the nut. Often the power wrench is slipped onto the nut sufficiently only to grip that portion of the nut in which the locking member is located. Under such a circumstance, the locking member portion of the nut may be distorted during the application of the nut to such an extent as to destroy the nut's usefulness. This has been found to occur frequently where the workmen are operating on a piecework basis or for some other reason are attempting to apply the nuts at a high rate.

An object of this invention is to improve the nut above referred to in such manner that one end of the nut can readily be distinguished from the other and it is impossible to distort the locking member portion of the nut by failure to engage the socket wrench with the nut member portion of the nut.

According to this invention, the tabs or extensions are inturned over the locking member under such conditions that the tab end of the completed nut is arcuately convex ith the bottom of the casing remaining a flat surface. The height of the nut at each corner exceeds slightly, if at all, the combined thickness of the casing bottom and nut member but increases inwardly until it equals the combined height of the casing bottom, nut member, locking member and tabs. The locking member end of the nut is, therefore, definitely of different appearance than the nut member end so that the workmen can determine at a glance which end of the nut is to receive the bolt. Also, due to the shape of the locking member end of the nut, the power wrench cannot obtain a grip on the nut until it fits around the nut member portion, thereby preventing all possibility of distortion of the locking member portion during application of the nut.

Other objects, novel features and advantages of this invention will become apparent from the following specification and accompanying drawing, wherein.

Figure 1:
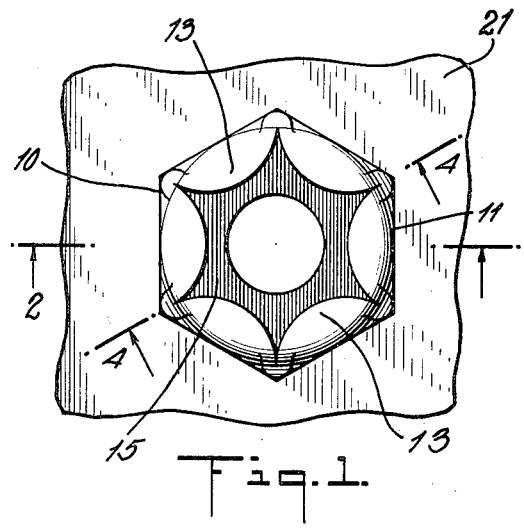
Fig. 1 is a plan view of a self-locking nut embodying the invention with a bolt inserted and serving to hold together two plates.
Figure 2:
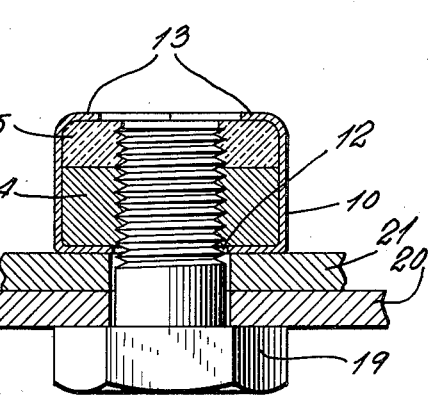
Fig. 2 is a section on the line 2—2 of Fig. 1.
Figure 3:
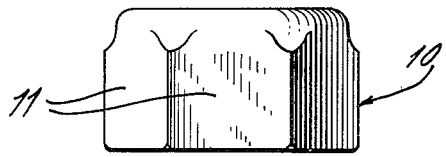
Fig. 3 is a side elevation of the nut.
Figure 4:
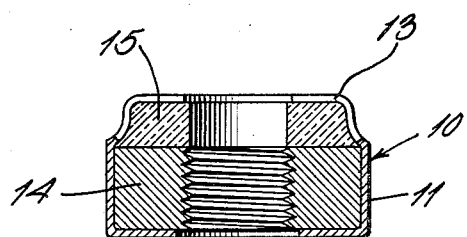
Fig. 4 is a section on the line 4—4 of Fig. 2 with the bolt removed.

A nut embodying this invention comprises a flat bottom sheet metal cup or casing 10 formed in such a manner as to have a series of flat wall portions 11 defining a polygonal socket with the flat portions 11 forming surfaces on which a wrench may obtain a grip. The bottom of the cup is provided with a hole 12 and the upper edge is scalloped or otherwise provided with extending tapered portions or tabs 13 which are adapted to be inturned as later to be described.

After the formation of the casing, a nut member 14 is inserted therein in contact with the casing bottom and a locking member 15 is placed on the nut member. Preferably, the nut member and the locking member are of the same configuration as the interior of the casing and fit the casing closely enough to prevent rotation thereof relative to the casing. The bore of the nut member 14 is threaded while the bore of the locking member 15 is smooth and of less diameter than the major diameter of the nut member thread. The locking member 15 may be of material known as vulcanized fiber, Bakelite, rubber or other elastic and relatively tough material of like nature.

Figure 5:
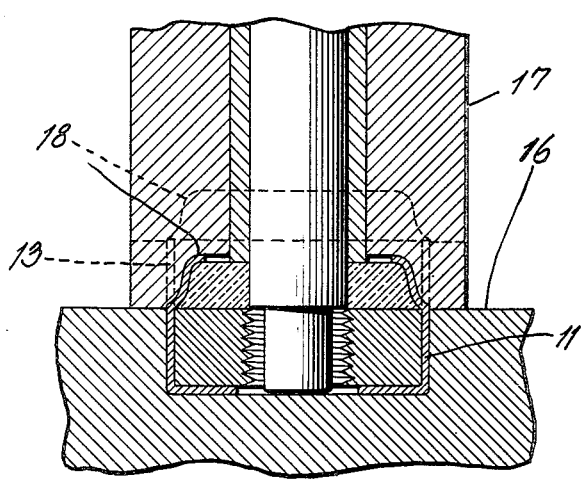
Fig. 5 is a sectional view of apparatus for inturning the tabs.
Figure 6:
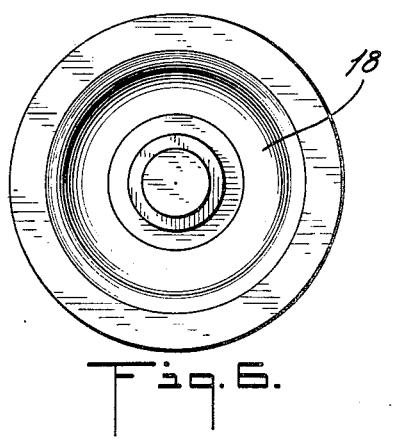
Fig. 6 is a face view of the punch of Fig. 5.

After location of the nut member 14 and locking member 15 in the casing, the latter is placed in a die or holding member 16 preferably having the same interior configuration as the exterior configuration of the casing and with the tabs 13 in the position indicated in dotted lines in Fig. 5. A plunger 17 is then advanced toward the assembly by any suitable means. In the end of the plunger 17 is a circular cross-section recess 18 which converges upwardly, the diameter of the mouth of the recess being at least equal to the distance between opposite corners of the nut. As the plunger approaches the assembly, it engages the high spots of the tabs 13 as indicated in dotted lines in Fig. 5 to bend them inwardly around the top edge of the locking member 15, thereby bringing the tabs into the position shown in full lines in Fig. 5 when the plunger has completed its stroke. With the tabs in this position, the locking member and nut member are clamped in the casing and that portion of the casing surrounding the locking member tapers in external contour from polygonal in a plane adjacent the junction plane between the nut member and one locking member face to circular in the plane of the remaining locking member face. The nut is now removed from the tab-bending apparatus by suitable means, not shown, and is ready for use.

By reason of the shape of the locking member portion of the nut, a grip thereon cannot be obtained by a power wrench and it is necessary to bring the power wrench into engagement with the nut member portion before the nut can be turned on to a bolt. Distortion of the nuts from improper application of the wrench is thereby prevented. The shape of the casing surrounding the locking member portion makes the two ends of the nut readily distinguishable.

In use, a bolt 19 passes through members 20 and 21 and enters the nut through the bottom aperture 12. The bolt is threaded into the nut member 14 in the usual manner and as it projects into the locking member 15, the bolt cuts a thread therein.

It is of course understood that various modifications may be made in the nut structure above described without in any way departing from the spirit of the invention as defined in the appended claims.

I claim:

1. A self-locking nut comprising in combination a metal casing having a base provided with an aperture and side members so arranged that the casing is polygonal in transverse cross-section, certain of said side members being provided with bendable extensions adapted to hold parts within the casing, a polygonal nut member positioned within the casing and having its sides shaped so as snugly to fit the side members of the casing, and a polygonal locking member positioned within the casing in contact with said nut member and snugly fitting the side member of said casing, said extensions projecting over said locking member to hold said nut member and locking member in said casing and said casing being substantially arcuately convex from near the junction plane of the nut member and one locking member face over the remaining locking member face whereby a socket wrench must extend over that portion of the casing enclosing said nut member in order to have the socket fit the casing.

2. A self-locking nut comprising in combination a metal casing having a base provided with an aperture and side members so arranged that the casing is polygonal in transverse cross-section, certain of said side members being provided with bendable extensions adapted to hold parts within the casing, a nut member positioned within the casing and having its sides shaped so as to fit snugly the side members of the casing, and a polygonal locking member positioned within the casing in contact with said nut member and snugly fitting the side members of said casing, said extensions projecting over said locking member to hold said nut member and locking member in said casing and that portion of the case surrounding the locking member tapering in external contour from polygonal in a plane adjacent the junction of the nut member and one locking member face to circular in the plane of the remaining locking member face.

FREDERICK R. REUTTER.